United States Patent [19]
Bennett et al.
[11] Patent Number: 4,826,104
[45] Date of Patent: May 2, 1989

[54] THRUSTER SYSTEM

[75] Inventors: James Bennett; Martin R. Heath; Peter G. Foulsham, all of Stevenage, United Kingdom

[73] Assignee: British Aerospace Public Limited Company, London, England

[21] Appl. No.: 129,419

[22] Filed: Nov. 25, 1987

Related U.S. Application Data

[63] Continuation of Ser. No. 917,597, Oct. 9, 1986, abandoned.

[51] Int. Cl.[4] .......... F42B 15/033
[52] U.S. Cl. .......... 244/3.22; 239/265.19
[58] Field of Search .......... 244/3.22; 239/265.19265.25, 265.29

[56] References Cited

U.S. PATENT DOCUMENTS

| | | | |
|---|---|---|---|
| 3,091,084 | 5/1963 | Eckhart | 244/3.22 |
| 3,721,402 | 3/1973 | Holland | 244/3.22 |
| 4,017,040 | 4/1977 | Dillinger et al. | 244/3.22 |
| 4,078,495 | 3/1978 | Ledden, Jr. | 244/3.22 |
| 4,085,909 | 4/1978 | East et al. | 244/3.22 |
| 4,541,592 | 9/1985 | Moll | 244/3.22 |

*Primary Examiner*—Deborah L. Kyle
*Assistant Examiner*—Michael J. Carone
*Attorney, Agent, or Firm*—Cushman, Darby & Cushman

[57] ABSTRACT

A thrust control valve which is operable to direct a gas supply to provide thrust is disclosed. The gas supply to obtained from a hot gas generator eg a rocket motor combustion chamber, and is directed through a nozzle by the operation of a plunger mounted within a pressure chamber. The pressure in the pressure chamber is controlled by the operation of a solenoid-operated poppet valve which moves between two positions to either pressurize the chamber ie sealing the nozzle with the plunger to provide no thrust, or to de-pressurize the chamber ie allowing gas from the gas supply to exit via the nozzle thereby providing thrust.

7 Claims, 4 Drawing Sheets

19 18 10 13
13
THRUST
14 17 24

THRUSTER SYSTEM

This is a continuation of application Ser. No. 917,597, filed Oct. 9, 1986, now abandoned which was abandoned upon the filing hereof.

This invention relates to thruster systems and is more particularly concerned with thrust control valves which are operable to control a gas supply to provide thrust.

According to one aspect of the invention, there is provided a thrust control valve operable to direct a gas supply to provide thrust, the valve including:

a housing;

nozzle means attached to the housing;

control means mounted within the housing;

pressure chamber means containing plunger means mounted within the housing; and gas supply means for providing a gas supply;

the control means being operable to cause the plunger means to come into sealing engagement with the nozzle means when in a first position, and to direct the gas supply through the nozzle means when in a second position.

According to a second aspect of the invention, there is provided a thrust control valve operable to direct a gas supply to provide thrust including a housing having nozzle means rigidly attached to it at one end, control means mounted within said housing, a pressure chamber having a gas inlet port and a gas outlet port also mounted within the housing, and a gas supply, the pressure chamber containing plunger means, the control means being operable to close off said outlet port when in a first position and to open said outlet port when in a second position, the plunger means being operable to come into sealing engagement with said nozzle means when said outlet port is closed and to direct said gas supply through said nozzle means when said outlet port is open, due to a pressure difference across it.

According to a third aspect of the invention, there is provided a rocket having a solid propellant motor the combustion chamber of which communicates via respective on-off valves with four fixed efflux nozzles, the rocket further comprising valve control means for opening and closing the valves during the flight of the rocket to produce thrust impulses from the respective nozzles which, summed over a period of time, constitute an overall rocket control force vector for that period while the number of valves open at any one time remains constant, each of the nozzles being directed to produce thrust comprising a radial component and two of the nozzles being positioned at respective opposite sides of and equispaced from the pitch plane of the rocket so that impulses from these two nozzles provide yaw control components of said vector while the other two nozzles are positioned both at the same side of the yaw plane and at one and the other side respectively of the pitch plane of the rocket so that impulses from these two nozzles provide roll control components and pitch control components of said vector.

According to a fourth aspect of the invention, there is provided a solid propellant rocket motor comprising a combustion chamber, a thruster nozzle the inlet of which is connected to the chamber, and an on-off plug valve which is at the combustion chamber side of said thruster nozzle inlet and which includes a valve member and actuator means for moving the valve member into and out of engagement with said inlet to control the flow of gas through the nozzle.

Advantageously, said thruster nozzle is attached to the wall of the combustion chamber and said valve is entirely mounted inside the combustion chamber.

Naturally, other mounting configurations of the valve are possible in which the valve is mounted external to the combustion chamber.

The valve may comprise a pressure chamber, in which said valve member is mounted for linear movement in response to a difference in pressure between the inside and outside of the chamber, the chamber communicating with the interior of said combustion chamber and, via a solenoid-controlled on-off servo-valve, with the exterior of the combustion chamber and the arrangement being such that, when said servo-valve is off, the pressure within the pressure chamber increases towards that of the combustion chamber and urged by this pressure, said valve member then moves into engagement with said nozzle inlet while, when said servo-valve is on, the pressure within the pressure chamber is released and then the valve member moves out of engagement with the nozzle inlet.

For a better understanding of the invention, reference will now be made, by way of example, to the accompanying drawings in which.

Figure 1:
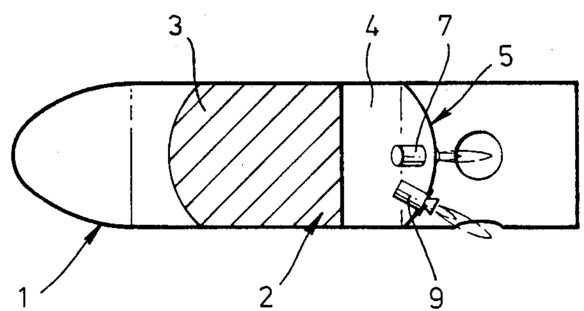
FIG. 1 is a sectioned side view of a rocket.
Figure 2:
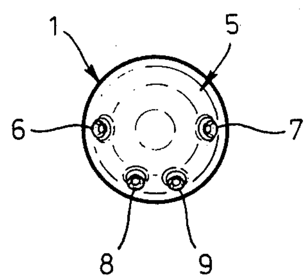
FIG. 2 is a view from the rear of a motor used in the FIG. 1 rocket.
Figure 3:
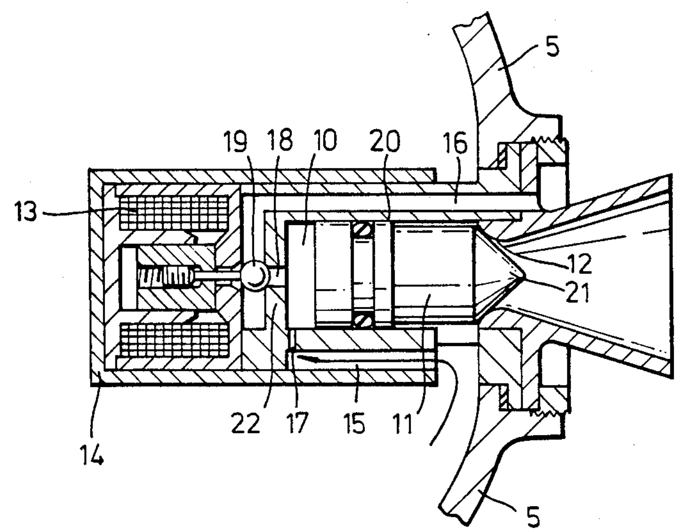
Figure 4:
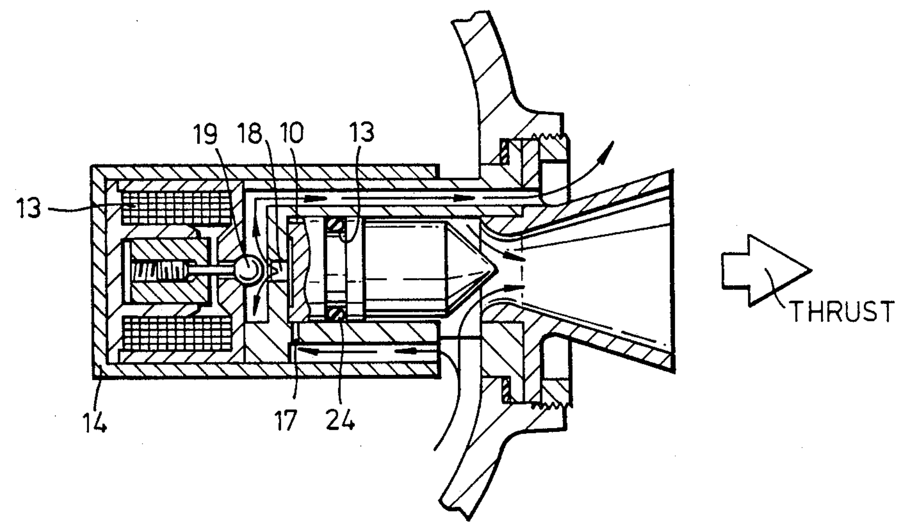
Figure 5:
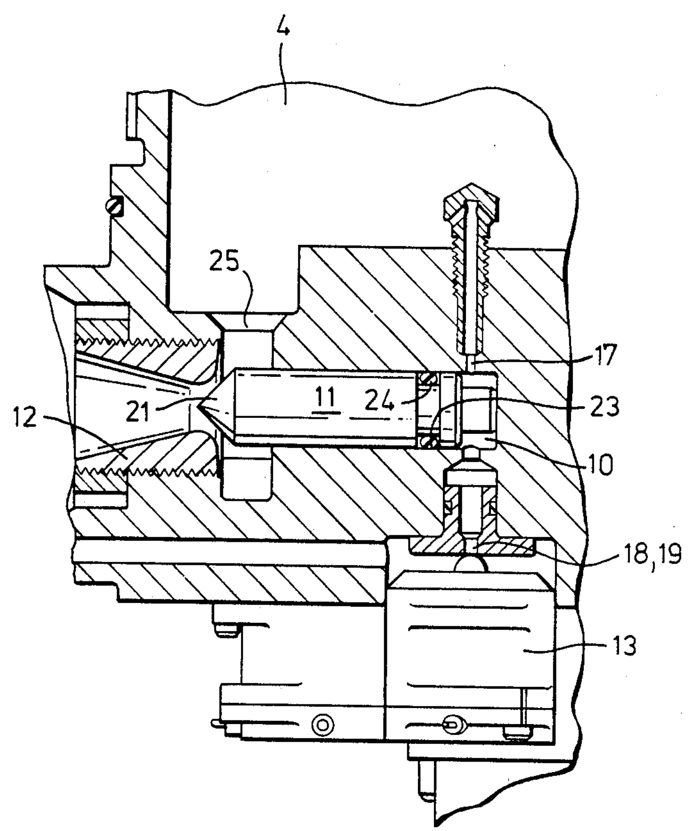
Figure 6:
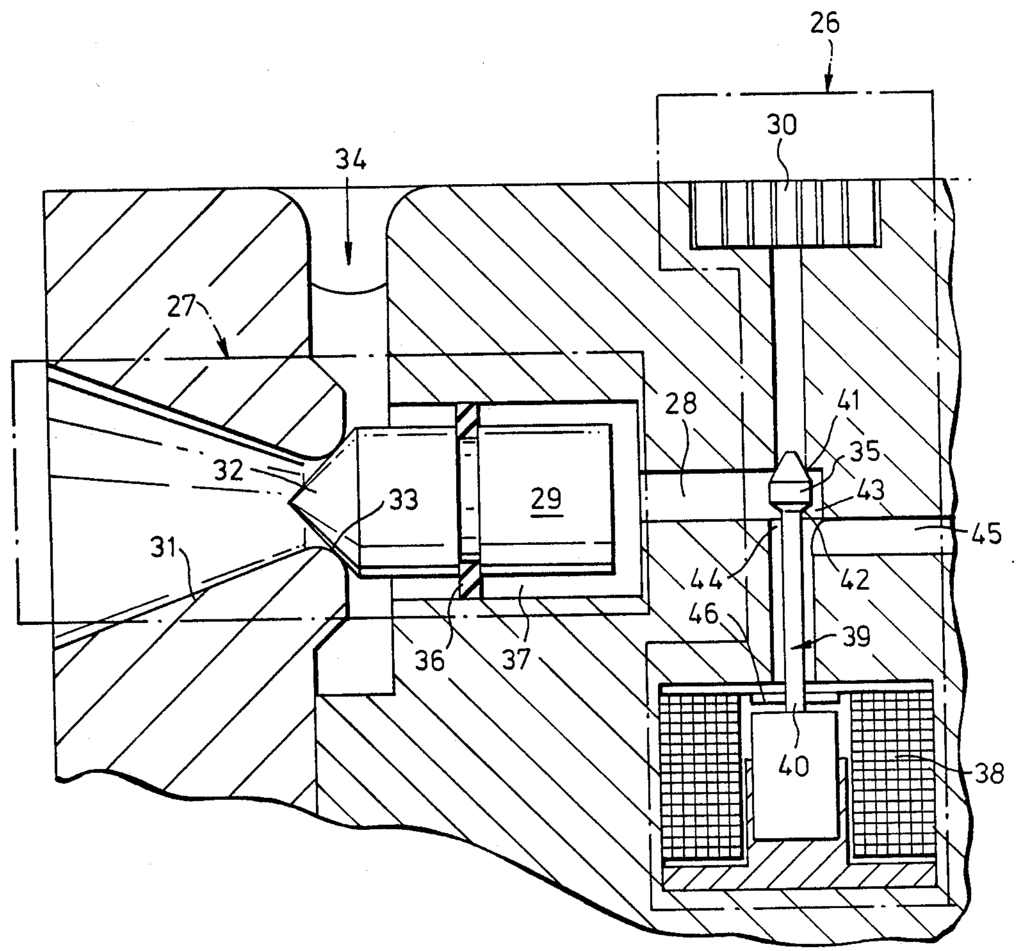

FIGS. 3 and 4 each comprise a sectional elevation of a control valve used in the FIG. 2 motor, the two figures showing the valve in its closed and open positions respectively;

FIG. 5 shows another embodiment of the control valve of FIGS. 3 and 4 in which the valve is mounted external to the combustion chamber; and FIG. 6 is a schematic diagram of a further embodiment of a control valve where the solenoid is positioned remote from the plunger.

The illustrated rocket consists of a body 1 which contains a motor 2. The motor 2 comprises a combustion chamber 4 which is partly filled with solid propellant 3. The rear of the combustion chamber 4 is defined by an end cap 5, to which there are attached four thruster nozzle/valve assemblies comprising nozzles 6, 7, 8 and 9. The valve in each nozzle/valve assembly is electrically controlled and when the valve is open, gas can exit from the combustion chamber 4 through the associated nozzle to provide thrust on the rocket. The valves in the respective nozzle/valve assemblies are operated in sequence to produce pulses of thrust from the associated nozzles, there being always at least one nozzle producing thrust at any one time. The number of valves open at any one time depends on the control system being used. This ensures that the gas flow from chamber 4 and hence the pressure therein remain constant.

The nozzles point outwards so that the thrust each nozzle produces can be resolved into two perpendicular components, one of these components acting along the rocket axis to provide forward propulsion of the rocket, and the other component acts in a direction extending radially outward from the rocket axis to provide control of the rocket in the pitch, yaw and roll planes.

Each nozzle produces a similar axial thrust component so that, even though the nozzles are being operated one at a time, the forward thrust remains substantially constant. Meanwhile, the overall radial thrust component over a given time period comprises the sum of the individual radial thrust components produced by the respective nozzles which have been operated during that time. Thus, radial control of the rocket, ie yaw, pitch and roll control, can be obtained by appropriately controlling which of the nozzles are operated, the sequence in which they are operated, and the respective times for which they are operated so as to give the appropriate overall radial thrust component.

The radial components of thrust produced by nozzles 6 and 7 act to move the rocket in the yaw plane ie to the right or left respectively. In order to obtain no net movement in the yaw plane, nozzles 6 and 7 have to be operated alternately for equal lengths of time or pulsed in pairs, the radial components of thrust cancelling each other out when summed. Nozzles 8 and 9 produce radial components of thrust which act downwards providing upward movement of the rocket and therefore control in the pitch plane. Downward movement of the rocket is provided by gravity. Roll control can be obtained together with upward pitch control by altering the times for which nozzles 8 and 9 operate so that a net radial component of thrust is produced which does not pass through the rocket axis thereby giving roll movement as well as an upward movement to the rocket.

Other nozzle arrangements are possible depending on the degree of control required in the pitch, yaw and roll planes.

As shown best in FIGS. 3 and 4, the valve of each nozzle/valve assembly is positioned within the combustion chamber of the rocket while the nozzle of the assembly projects through the motor end cap 5.

The valve consists of a housing 14 defining a cylinder 20, one end of which engages the inlet aperture 12 of the nozzle and which contains a plug-valve member 11. The valve member 11 has a conical sealing surface 21 at one end, the end nearer the aperture 12, and has a diameter which for about half the length of the member extending back from the surface 21 is slightly less than the internal diameter of the cylinder 20. The remaining part of the member 11, apart from a groove 23 containing a flexible sealing ring 24, is a sliding fit within the cylinder 20. The member 11 is able to move within the cylinder 20 between a 'nozzle-closed' position shown in FIG. 3, in which position the surface 21 closes the aperture 12, and a 'nozzle-open' position shown in FIG. 4, in which position the surface 21 is away from the aperture 12 so that gas can exit from the combustion chamber through duct 25 leading to the aperture 12. Between the other end of the valve member 11 and a wall 22 closing the other end of the cylinder 20 there is defined a pressure chamber 10.

A hole 18 in the cylinder end wall 22, which hole can be closed by a valve-member 19 forming part of a solenoid-operated servo-valve 13, provides communication via a duct 16 between the pressure chamber 10 and the exterior of the combustion chamber. Meanwhile, a small metering orifice 17 leads from the chamber 10 to a duct 15 which in turn leads to the interior of the combustion chamber.

To close the valve as shown in FIG. 3, the solenoid of the servo-valve 13 is energised so as to maintain the valve member 19 in sealing engagement with the hole 18. Hence, due to the communication between the chamber 10 and the combustion chamber via duct 15 and orifice 17, pressure builds up in the pressure chamber 10 and at first forces the valve-member 11 into engagement with the nozzle inlet 12, and then maintains it in this position. When the solenoid 13 is de-energised, the valve-member 19 is pushed away from the hole 18 by the pressure within chamber 10. This allows the gas collected in the pressure chamber 10 to vent to the atmosphere along duct 16. As the pressure in the pressure chamber 10 decreases, the valve member 11 is forced out of engagement with the nozzle aperture 12 by the pressure within the combustion chamber acting upon the periphery of surface 21 and the boundary between the narrow and wider diameter parts of the member 11. Gas from the combustion chamber is now able to exhaust through the nozzle to provide the required thrust. Some of the exhaust gas from the combustion chamber still flows into the pressure chamber 10 via orifice 17 but is able to leak away via hole 18, the relative sizes of the hole 18 and orifice 17 being chosen to ensure that the pressure within chamber 10 at this time remains less than that in the combustion chamber. When the solenoid 13 is energised, the hole 18 is closed so allowing the pressure inside chamber 10 to build up and force valve member 11 against the nozzle inlet 12 as described earlier.

By mounting the valve in the combustion chamber, a faster operation time can be achieved as only a relatively small volume of gas has to be removed from the pressure chamber 10 before the valve will operate. Naturally, it is possible to mount the valve/nozzle assembly external to the combustion chamber.

The valve housing 14 and valve member 11 are made of high temperature resistant materials for example the valve member could comprise titanium alloy with a tip, defining surface 21, made of molybdenum alloy. The housing and nozzle, and perhaps also the valve member, could comprise ceramic material. Naturally, the materials are chosen to be compatible with the application of the nozzle, for example, the temperature of the operating gas.

FIG. 5 illustrates an arrangement in which the nozzle/valve assembly is mounted external to the combustion chamber, the axis of the nozzle being perpendicular to that of the solenoid. Operation of the assembly is as previously described with reference to FIGS. 3 and 4, but the assembly is only shown as the valve is about to be closed ie the valve member 19 is in engagement with the hole 18 to allow the pressure to build up in the pressure chamber 10 via metering orifice 17, thereby pushing the surface 21 into engagement with the aperture 12. Similar items in FIG. 5 to those of FIGS. 3 and 4 are numbered alike. It can be seen that the gas supply to both the nozzle and the metering orifice are obtained from the combustion chamber 4.

FIG. 6 illustrates another arrangement of the nozzle/valve assembly. In this configuration, a solenoid-operated actuator 26 is mounted away from the nozzle/-valve assembly 27 but is connected to it by a duct 28 which supplies the gas to operate the valve member or piston 29 of the assembly 27. Both the actuator 26 and the assembly 27 are operated by hot gas generated by a gas generator, for example a thruster charge (not shown) or a rocket motor combustion chamber as previously described. The actuator 26 uses a gas supply which is tapped from the gas generator and passes through a filter 30.

The nozzle/valve assembly 27 comprises a nozzle 31 which is either open or closed depending on the position of the piston 29. The piston 29 has a conical sealing surface 32 which engages with the neck portion 33 of the nozzle 31 when the nozzle is closed. Gas is supplied to the nozzle 31 by gas supply 34 from the generator as previously described. Operation of the piston 29 is controlled by the actuator 26 in which the gas pressure is switched between the supply which passes through filter 30 and the ambient pressure by means of a solenoid-operated poppet valve 35, the piston moving within a seal retainer 36 which isolates the gas in space 37 to the rear of the piston from the gas supply 34.

The actuator 26 comprises a solenoid coil 38 which is used to operate a plunger 39 connected to the poppet 35 via a shaft 40, and is supported and held loosely by the shaft 40 so that the poppet 35 can self-centre on supply and exhaust seats, 41 and 42 respectively of the arrangement. Engagement of the poppet 35 with the supply seat 41 allows the gas in space 37 to vent to atmosphere via the poppet cavity 43 and an annular orifice 44 formed by the shaft 40 and exhaust passage 45. Engagement of the poppet 35 with the exhaust seat 41 allows gas to flow into the space 37 via duct 28 from the gas supply passing through filter 30 and the gas pressure produced on the piston 29 causes it to move into engagement with the nozzle 31 closing it off.

When current is supplied to the solenoid 38, the plunger 39 is attracted to the pole face 46 and this causes the poppet 35 to lift off the exhaust seat 42 and engage with the supply seat 41, allowing the gas in space 37 to vent to atmosphere as described above. The resulting pressure imbalance on the piston 29 causes it to retract opening the nozzle 31. To close the nozzle 31, current is removed from the solenoid 38 and gas pressure from the supply through filter 30 pushes the poppet 35 off the supply seat 41 and back onto the exhaust seat 42 allowing the gas from the supply through filter 30 to flow into the space 37 via duct 28 to repressurise the space 37, forcing the piston 29 into engagement with the nozzle 31 thereby closing off the supply 34.

The switching time for the nozzle 31 is determined by a combination of electrical and mechanical delays, the time taken to pressurise and depressurise the space 37 behind the piston 29 and the time needed to accelerate the piston 29 within the seal retainer 36. A pneumatic delay needs to be considered also, as this is related to the 'dead' volume of the actuator arrangement ie it depends on the total volume defined by the space 37, the duct 28 and the poppet cavity 43.

The actuator 26 and nozzle/valve assembly 27 may be both housed in a solid titanium housing 48. Titanium is used as it is non-magnetic and therefore does not interfere with the flux circuit of the solenoid 39. It is also lightweight and capable of withstanding high temperatures of around 2700K which are obtained when using a hot gas.

We claim:

1. A thrust control valve operable to control the supply of gas from gas generating means to provide thrust comprising:

a housing for pressurized gas;

conical thrust nozzle means having the smaller end thereof attached to said housing and having an axial inlet surrounded by a valve seat;

valve means in said housing including means defining a tubular valve chamber aligned with said nozzle means and having an open end and a closed end and a valve member reciprocable in and sealingly engaged with the side walls of said chamber, one end of said valve member being seatable through said open end on said seat to open and close said inlet and said valve member and the closed end of said chamber cooperating to define a pressure chamber, said valve member having means defining differential pressure areas on opposite sides of said sealing engagement with the smaller of said areas facing said open end;

means for supplying gas under pressure from said housing to said valve chamber on opposite sides of said sealing engagement whereby the pressure in said pressure chamber moves said valve member to close said inlet; and control means in said housing for venting to atmosphere said pressure chamber, whereby the pressure on said smaller area moves said valve member to open said inlet.

2. A control valve according to claim 1, wherein the gas supply means is a rocket motor combustion chamber.

3. The valve defined in claim 2 wherein the valve is located within the combustion chamber.

4. A control valve according to claim 1, wherein the gas supply means is a thruster charge.

5. The valve defined in claim 1 wherein the means for supplying gas under pressure to the pressure chamber includes a metering orifice to insure, when the control means vents the pressure chamber, that the pressure force on the larger of the differential areas is smaller than that on the smaller of said areas.

6. The valve defined in claim 5 wherein the metering orifice comprises a filter.

7. The valve defined in claim 1 wherein the control means includes a solenoid operated valve within the housing.

* * * * *